M. BANOWETZ.
LAWN MOWER.
APPLICATION FILED MAR. 23, 1910.
1,001,917.
Patented Aug. 29, 1911.
2 SHEETS—SHEET 1.
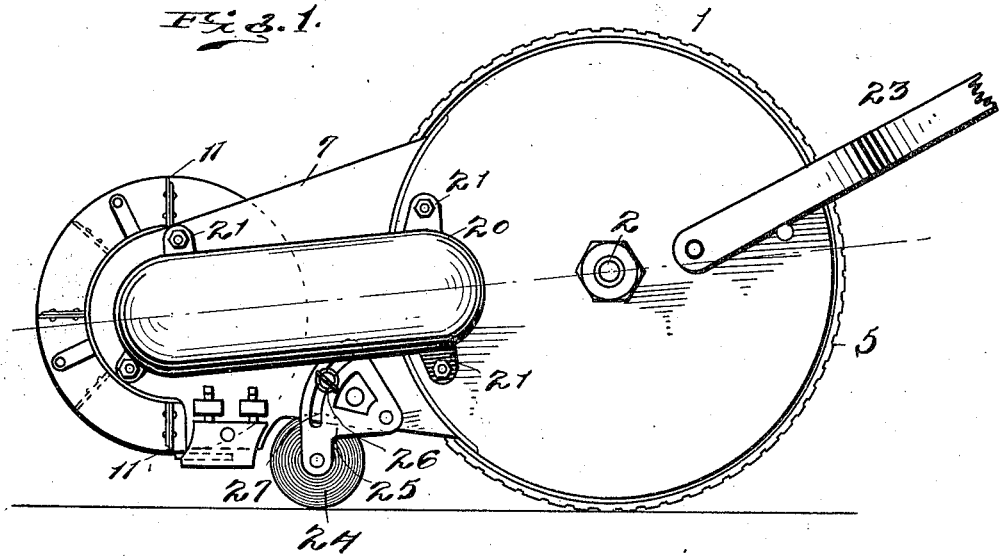
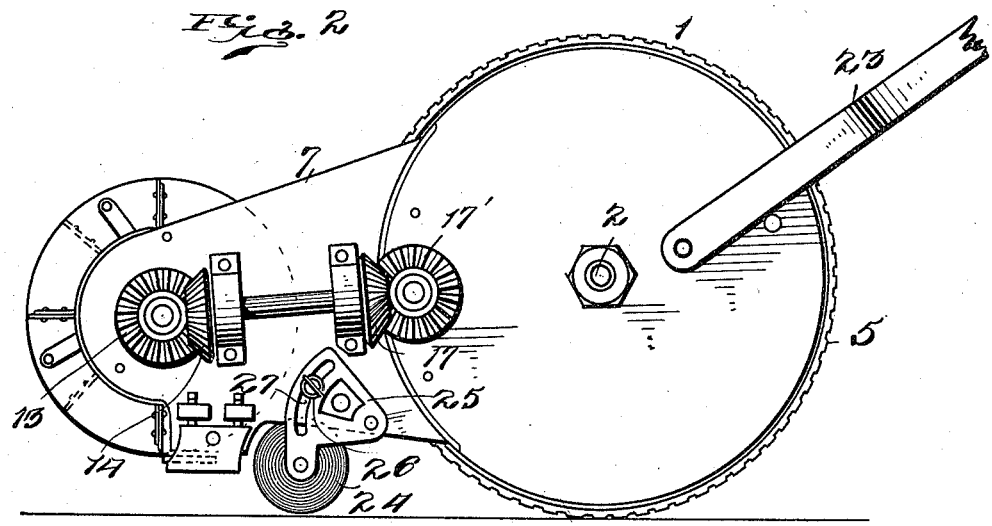
Inventor
Mike Banowetz.
Witnesses

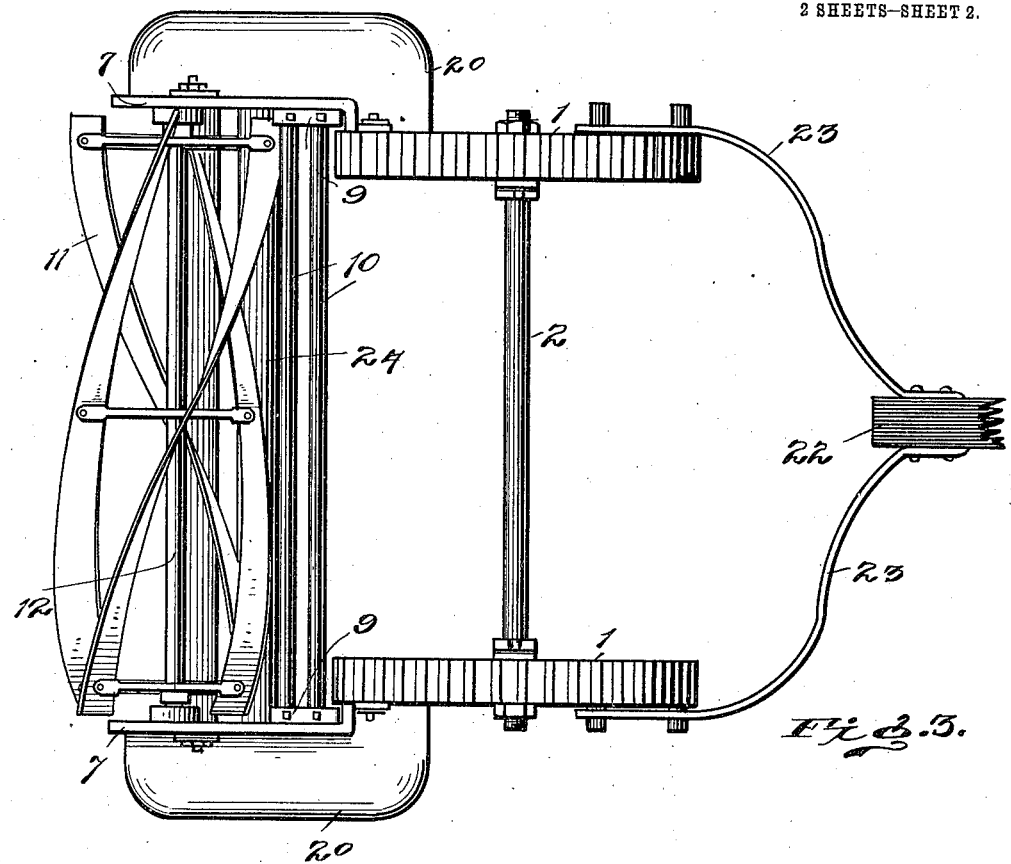
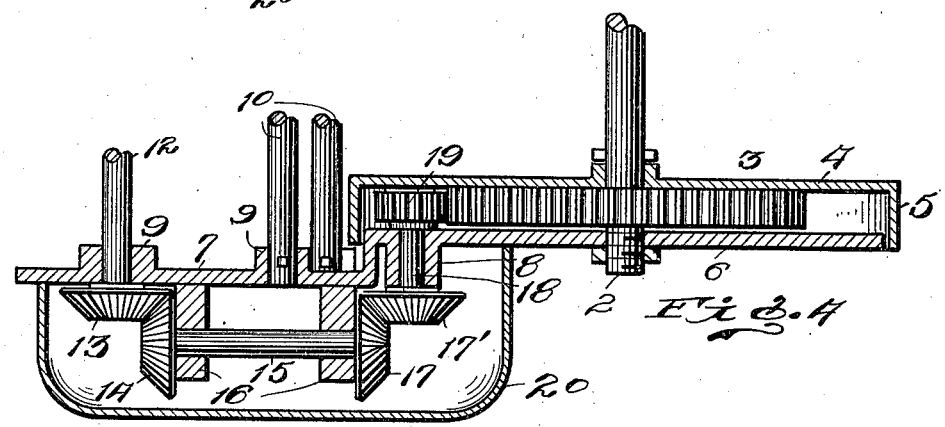

UNITED STATES PATENT OFFICE.

MIKE BANOWETZ, OF COFFEYVILLE, KANSAS.

LAWN-MOWER.

1,001,917.  Specification of Letters Patent.  Patented Aug. 29, 1911.

Application filed March 23, 1910. Serial No. 551,143.

*To all whom it may concern:*

Be it known that I, MIKE BANOWETZ, a citizen of the United States, residing at Coffeyville, in the county of Montgomery and State of Kansas, have invented certain new and useful Improvements in Lawn-Mowers, of which the following is a specification, reference being had therein to the accompanying drawing.

This invention relates to lawn-mowers and has for its object to provide a lawn-mower so constructed and arranged that it will be strong and durable and will effectively carry on the work which it performs.

The invention has further for its object to provide an improved lawn-mower having its operating mechanism so constructed and arranged that it will occupy little space and at the same time will furnish effective driving power for the cutters.

With these and other objects in view, the invention comprises certain novel constructions, combinations and arrangements of parts as will be hereinafter fully described and claimed.

Referring to the accompanying drawings: Figure 1 is a side view of a lawn-mower constructed in accordance with this invention. Fig. 2 is a view similar to Fig. 1 showing a portion of the operating mechanism uncovered. Fig. 3 is a plan view of the lawn-mower. Fig. 4 is an enlarged detail view partly in horizontal section and broken away of a portion of the operating mechanism.

In the construction of this invention, a pair of toothed driving wheels 1 are mounted upon a shaft 2, said driving wheels 1 being each formed of a disk-shaped plate 4 fastened to the shaft 2 and having an annular flange 5 with teeth 5' on its periphery. A disk-shaped plate 6 is located on the outside of the wheel 1 and within its periphery and forms with the flange wheel 1 a casing. The plate 6 is formed with an extension 7 having a tubular projection 8 and tubular projection 9. The extensions 7 are connected together and braced by means of rods 10.

The cutting knives 11 of the lawn-mower are mounted on a shaft 12 which has its bearings in the projection 9 on each of the extension plates 7. The shaft 12 is connected with the driving wheels 1 by means of a beveled gear wheel 13, on each end of the shaft 12, which meshes with a beveled gear wheel 14 on one end of a short shaft 15 having its bearings in detachable brackets 16, mounted on the extension plate 7, the other end of shaft 15 having a beveled gear wheel 17 meshing with a beveled gear wheel 17' on the end of a short shaft 18, mounted in the projection 8, of the plate 6, the other end of shaft 18 being provided with a toothed pinion wheel 19, which meshes with a toothed wheel mounted on the shaft 2 and driving wheel 1 and inclosed between the wheel 1 and the plate 6. It will be seen that by means of this construction motion from the driving wheels 1 will be directly transmitted to the shaft 12 of the cutter, with a movement which will furnish the necessary power and velocity for operating the cutters 11. Furthermore, the gear mechanism connecting each driving wheel 1 with the shaft 12 of the cutters is inclosed by a casing 20 secured by straps and bolts 21 to the plate 6 and extension plate 7.

It will be seen that the operating mechanism is suitably covered without occupying much space.

The lawn-mower is operated by means of a suitable handle 22, connected by curved metallic strips 23 secured to the plates 6.

The lawn-mower is further provided with a guide roller 24 which is located beneath the extensions 7 and between the forward end of the machine and the driving wheels. The roller 24 is mounted at each end on a plate 25 hinged to extension plates 7, and adjustable thereon by means of a clamping pin 26 projecting through a curved slot 27 in the plate 25 and engaging an extension 7. By this means the forward end of the machine may be raised and lowered to adjust the distance of the cutters from the ground.

It will be seen that by means of the construction herein shown and described an improved lawn mower is provided the mechanism of which occupies very little room and at the same time affords the necessary driving power for operating the cutter and which is light and durable.

Having described the invention I claim:

A lawn-mower consisting of a rotary shaft, a driving wheel mounted on each end of said shaft and consisting of a disk with an annular flange having a toothed periphery, a disk located within said annular flange and forming with the wheel a casing and having a forward extension with a stub bearing, a cutter shaft and cutters, said cutter shaft having its bearing in said stub bearing of said extension and having a beveled gear wheel at each end, a toothed wheel on each end of the rotary shaft and secured to and located within the driving wheel, a pinion wheel meshing with said toothed wheel and located within the driving wheel, a shaft projecting from said pinion wheel and having a beveled gear wheel on its other end, a shaft mounted in detachable bearings on the extension and having a beveled gear wheel at each end, one of which meshes with the gear wheel at the end of the cutter shaft and the other with the gear wheel at the end of the pinion shaft, a detachable, oblong casing inclosing said beveled gear wheel mechanism, a transverse roller extending beneath the extensions and between the driving wheels and cutters and a triangular plate pivoted at its apex to the side of each extension and pivotally connected at its lower corner to one end of said roller, said plates each having a curved slot in its outer end and a clamping adjusting pin located in the extension and projecting through said slot.

In testimony whereof I hereunto affix my signature in presence of two witnesses.

MIKE BANOWETZ.

Witnesses:
R. H. MUZZY,
D. H. MARTIN.

Copies of this patent may be obtained for five cents each, by addressing the "Commissioner of Patents, Washington, D. C."